UNITED STATES PATENT OFFICE.

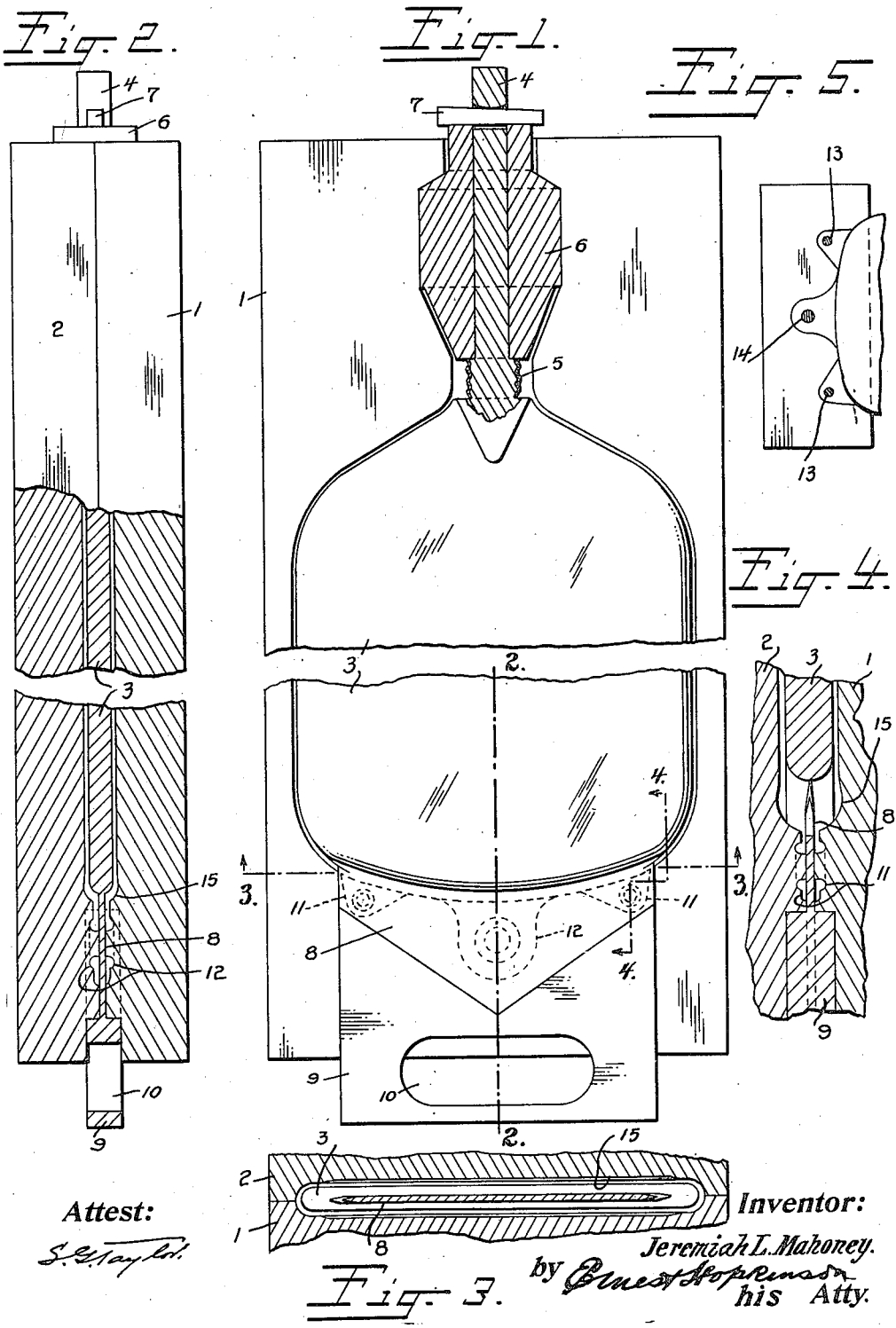

JEREMIAH L. MAHONEY, OF NEW HAVEN, CONNECTICUT, ASSIGNOR TO THE GOODYEAR'S INDIA RUBBER GLOVE MANUFACTURING COMPANY, A CORPORATION OF CONNECTICUT.

PROCESS FOR VULCANIZING RUBBER ARTICLES.

1,289,776.   Specification of Letters Patent.   Patented Dec. 31, 1918.

Application filed May 21, 1917. Serial No. 169,818.

*To all whom it may concern:*

Be it known that I, JEREMIAH L. MAHONEY, a citizen of the United States, residing at New Haven, county of New Haven, State of Connecticut, have invented certain new and useful Improvements in Processes for Vulcanizing Rubber Articles, of which the following is a full, clear, and exact description.

My invention relates to processes for vulcanizing hollow rubber articles, such as hot water bottles, which are molded as a complete unitary article about a central core, the core being removed through an opening formed therein during the molding operation. The object of my invention is to produce a hot water bottle which will be free from the usual defects often accompanying the molding of such articles, and which will result in decreasing the expense of manufacture by saving in labor, time and the percentage of defective articles.

This application is a companion case of my copending application Serial No. 211,904 and bears more directly upon the manner of supporting the article during the molding and vulcanizing treatment to prevent any possible distortion of the parts that are not being subjected to such treatment.

For a full, clear and exact description of one form of my invention, reference may be had to the following specification and to the accompanying drawings forming a part thereof, in which:

Figure 1 is a plan view of one mold member and a core for forming a water bottle, the neck and funnel portion of the mold being shown in cross-section.

Fig. 2 is a side elevation of two mold members, and the core in their relative positions, the lower portion of the mold being shown cut away and in section, the section being taken substantially on the line 2—2, Fig. 1.

Fig. 3 is a sectional view of the mold members taken substantially on the line 3—3, Fig. 1.

Fig. 4 is a sectional view of a portion of the mold members and core taken substantially on the line 4—4, Fig. 1.

Fig. 5 is a plan view of one of the mold members for giving the final cure to the article in order to close the opening therein through which the core has been removed.

Referring to the drawings numerals 1 and 2 indicate the two outer mold members, the numeral 3 indicates the core for the interior of the bottle; 4 indicates a stud or rod extending from the core 3, on the lower or inner end of which is carried the usual threaded nipple or thimble 5 forming a socket for the stopper and about which the rubber neck portion is molded. Numeral 6 indicates the core for forming the funnel portion of the bottle and through an opening in which core the stud 4 projects. The core is held in position by any suitable means, such as a tapering pin or wedge 7 which passes through an opening in the stud 4. Projecting from the lower end of the core 3 is a fin 8 which is enlarged at its outer end 9 and provided with an opening 10 through which the hand may be passed when removing the core from the mold and in stripping the bottle from the core. The fin 8 is adapted to form an opening in the lower end of the rubber bottle through which the core may be removed. The outer mold members are provided with suitable recesses which will form the tabs 11 and 12, as indicated in dotted lines in Fig. 1 and in full lines in Figs. 2 and 4. In order that the opening formed in the lower end of the bottle through which the core is removed may have sharp or acute ends so that the walls of the bottle adjacent thereto may be accurately brought together, the margins of the fin 8 are tapered so as to form sharp edges, as indicated in Figs. 3 and 4. This construction obviates the necessity of inserting a vulcanizable strip of rubber in the opening before the final vulcanization, it being only necessary to apply vulcanizable cement to the edges of the opening in order to have them firmly vulcanized together in the final cure.

The use of the additional tabs or lugs 11 formed on the lower end of the bottle is to enable the said end to be firmly and accurately retained in the final vulcanizing mold, as indicated in Fig. 5. In the mold members 1 and 2 the centers of the openings through tabs 11 and 12 are made a definite distance from the edge of the opening which forms the side walls of the bottle, such as for instance, ⅜" in the case of the lugs 11, and ⅝" in the case of the lug 12. In the final vulcanizing mold members, dowel pins 13 and 14 are provided, the centers of which are separated by a slightly greater distance from the edge of the recess which contains the body portion of the bottle than were the centers of the holes from the corresponding recess in the first or forming mold. For instance, the centers of these dowel pins may be $\tfrac{7}{16}''$ and $\tfrac{11}{16}''$ respectively, from the corresponding edges of the recess as relates to the tabs 11 and 12. By this arrangement the rubber of the tabs is stretched to a slight extent and the body portion of the bottle consequently drawn closely against the inner surface of the final mold members. During final vulcanization for closing the opening in the bottle, the bottle is preferably suspended from its lower end in a vertical position in order to eliminate distortion of the rubber during the vulcanizing process. But the weight of the bottle in this position does not affect the accurate registry of the parts or the accurate shaping of the bottle, because the body portion thereof is held firmly suspended between the mold members under tension of the rubber forming the tabs. This feature of the process for final vulcanization I consider a valuable one in vulcanizing hollow articles under conditions set forth. It should be noted that the lower ends of the recesses which form the corresponding end of the body of the bottle are made slightly deeper than the main portion of said recesses as indicated at 15. This increase in depth corresponds to the thickness of the fin or plate 8 so that when the sides of the opening formed thereby are brought together, the body of the bottle will have the same uniform thickness throughout after final vulcanization.

The process for forming the bottle is carried out in the usual way well known in the art relating to hollow rubber articles formed about a central core which is removed after the first cure,—that is, after the first cure the bottle and core is removed from the outer mold members and the neck and funnel portions of the mold removed. The bottle is then stripped from the core by withdrawing the same through the opening formed in the end of the bottle. The lower end of the bottle is then placed on the dowel pins between the mold members of the final curing mold, vulcanizable cement having been placed on the edges of the bottle about said opening. The final cure is then completed and the bottle finished. This may include a removal of the tabs 11 or they may be allowed to remain in position, if deemed preferable.

Having thus described this form of my invention, what I claim and desire to protect by Letters Patent is:

1. A process of closing an opening in a hollow rubber article provided with portions extending beyond the opening which comprises supporting the walls adjacent the opening against rigid supports, applying a vulcanizable compound at the edges of said opening, fixing the portions at predetermined points, placing the portions under tension to produce pressure on the walls of the opening by the said supports, suspending the article from said points, and finally vulcanizing.

2. A process of joining two surfaces of a rubber article together which comprises placing the surfaces in contact with each other, stretching the rubber in the direction of the joint, subjecting the joint to pressure, suspending the article from points beyond the joint and simultaneously with said suspension, pressure and stretching, subjecting the joint to vulcanization.

Signed at Naugatuck, Connecticut, this 16th day of May, 1917.

JEREMIAH L. MAHONEY.